(12) United States Patent
Popeil et al.

(10) Patent No.: US 7,065,883 B2
(45) Date of Patent: Jun. 27, 2006

(54) DEVICE TO LIFT, MOVE AND FLIP FOODS

(75) Inventors: Ronald M. Popeil, Beverly Hills, CA (US); Alan L. Backus, Los Angeles, CA (US)

(73) Assignee: Ronco Marketing Corporation, Chatsworth, CA (US)

( * ) Notice: Subject to any disclaimer, the term of this patent is extended or adjusted under 35 U.S.C. 154(b) by 0 days.

(21) Appl. No.: 10/196,585

(22) Filed: Jul. 15, 2002

(65) Prior Publication Data

US 2004/0006876 A1    Jan. 15, 2004

(51) Int. Cl.
*A47J 43/28*    (2006.01)
(52) U.S. Cl. .............................. 30/322; 30/323; 294/26; 294/50.6
(58) Field of Classification Search ................ 30/322, 30/323; 294/26, 3.6, 50.6, 131; D7/683, D7/653; D8/13, 14; 99/419, 441; 172/375
See application file for complete search history.

(56) References Cited

U.S. PATENT DOCUMENTS

| | | | |
|---|---|---|---|
| 144,542 A * | 11/1873 | Holman | ................... 30/322 |
| 234,855 A * | 11/1880 | Daniels | ................... 30/322 |
| 416,736 A * | 12/1889 | McPherson | ................ 30/322 |
| 421,009 A * | 2/1890 | Myrick et al. | ............... 30/322 |
| 448,647 A | 3/1891 | Freeman | |
| 689,778 A * | 12/1901 | Barnard | ................... 30/323 |
| 749,110 A | 1/1904 | Spangler | |
| 749,414 A | 1/1904 | Washington | |
| 779,839 A * | 1/1905 | Chevallard | ................. 76/109 |
| 849,098 A | 4/1907 | Aufrichtig | |
| 1,089,118 A | 3/1914 | Emory | |
| 1,095,054 A | 4/1914 | Wiesenfeld | |
| D46,577 S * | 10/1914 | Parker | ................. D7/683 |
| 1,121,657 A | 12/1914 | Parker | |
| 1,194,695 A * | 8/1916 | Anderson | ................ 294/26 |
| 1,202,120 A | 10/1916 | Stuckel | |
| 1,214,522 A | 2/1917 | Eckert | |
| 1,228,821 A | 6/1917 | Reynolds | |
| 1,252,197 A | 1/1918 | Thomas | |
| 1,313,417 A * | 8/1919 | Raymond | ................ 294/26 |
| 1,484,100 A | 2/1924 | Wertz | |
| D68,075 S * | 8/1925 | Wilson | ................. D7/653 |
| 1,605,322 A | 11/1926 | Bates | |
| 1,754,968 A | 4/1930 | Smith | |
| 1,875,680 A | 9/1932 | Van Horn | |

(Continued)

FOREIGN PATENT DOCUMENTS

GB    251817    *    5/1926    ................. 30/322

(Continued)

OTHER PUBLICATIONS

Pearson Dental Supply catalog page—Star Dental Explorers D/E.

(Continued)

*Primary Examiner*—Timothy V. Eley
*Assistant Examiner*—Jason Prone
(74) *Attorney, Agent, or Firm*—Jeffer Mangels Butler & Marmaro LLP

(57) ABSTRACT

Double hooked device with the hooks being transversely positioned on the end of a shaft having a handle at its opposite end. The hooks may snag, lift, move and/or flip food or other articles by the hooks being rotated generally about the shaft's axis until one of the double hooks penetrates into the article to be lifted. A shield at the base of the handle is a guard to cover the tips of the hooks.

29 Claims, 9 Drawing Sheets

U.S. PATENT DOCUMENTS

| | | | | |
|---|---|---|---|---|
| D103,241 S | * | 2/1937 | Lowenstein | 30/322 |
| D109,133 S | * | 4/1938 | Galleazzi | 30/322 |
| 2,297,566 A | | 9/1942 | Laux | |
| D138,732 S | * | 9/1944 | Osborn | 30/322 |
| 2,539,849 A | * | 1/1951 | Lum | 30/322 |
| D166,441 S | | 4/1952 | Bert | |
| 2,604,350 A | | 7/1952 | Taylor | |
| 2,607,988 A | | 8/1952 | Williams | |
| 2,707,651 A | * | 5/1955 | Ott | 30/322 |
| D175,187 S | * | 7/1955 | Perez | D7/683 |
| 2,724,207 A | | 11/1955 | Miller et al. | |
| 2,727,777 A | * | 12/1955 | Johnstone et al. | 294/26 |
| 2,864,163 A | | 12/1958 | Boruvka | |
| 2,892,655 A | | 6/1959 | Bower | |
| 3,038,402 A | | 6/1962 | Singer | |
| 3,078,787 A | | 2/1963 | Arseneault | |
| 3,162,475 A | | 12/1964 | Van Allen | |
| 3,309,773 A | | 3/1967 | Weller | |
| D208,034 S | * | 7/1967 | Canion | D7/683 |
| 3,361,468 A | | 1/1968 | Case | |
| 3,585,050 A | | 6/1971 | Singer et al. | |
| D224,337 S | * | 7/1972 | Nocero | 30/323 |
| D227,294 S | * | 6/1973 | Maynard | 30/322 |
| 3,758,143 A | | 9/1973 | Godlewski | |
| 3,858,320 A | * | 1/1975 | Neal et al. | 30/323 |
| 3,936,088 A | * | 2/1976 | Williams | 294/26 |
| 4,002,365 A | | 1/1977 | Rader | |
| 4,103,420 A | * | 8/1978 | Davis | 30/323 |
| 4,126,086 A | | 11/1978 | Valade | |
| 4,168,856 A | | 9/1979 | Rhoades | |
| D253,989 S | | 1/1980 | Rhoades | |
| D268,561 S | | 4/1983 | Risser | |
| 4,404,749 A | | 9/1983 | Emerson | |
| D273,075 S | | 3/1984 | Hayden | |
| D273,360 S | * | 4/1984 | Hill | D7/683 |
| 4,539,751 A | | 9/1985 | Chan | |
| 4,589,333 A | | 5/1986 | Murphy | |
| 4,734,984 A | | 4/1988 | Snell et al. | |
| 4,955,971 A | | 9/1990 | Goulter | |
| 5,004,419 A | | 4/1991 | Kline | |
| 5,067,944 A | * | 11/1991 | Nichols | 604/192 |
| D330,492 S | | 10/1992 | Brown | |
| 5,154,116 A | | 10/1992 | Dubé | |
| 5,167,063 A | | 12/1992 | Hulsink | |
| D332,554 S | * | 1/1993 | Gomez et al. | D7/683 |
| 5,228,201 A | | 7/1993 | Atkins | |
| D356,409 S | | 3/1995 | Kanaskie | |
| 5,403,052 A | | 4/1995 | Lampron | |
| D359,122 S | | 6/1995 | Kountis | |
| 5,581,895 A | | 12/1996 | Jeffcoat | |
| 5,668,011 A | | 9/1997 | Jackson | |
| 5,749,268 A | | 5/1998 | Nishimura | |
| 5,749,286 A | | 5/1998 | Payette | |
| 5,813,120 A | | 9/1998 | Stroh | |
| 5,845,404 A | | 12/1998 | Jeffcoat | |
| 5,881,633 A | | 3/1999 | Adams | |
| 5,890,223 A | * | 4/1999 | Klemmer | 30/323 |
| 5,896,668 A | | 4/1999 | Murrell | |
| D425,379 S | | 5/2000 | Clausen | |
| 6,234,162 B1 | | 5/2001 | Wenker | |
| 6,247,736 B1 | | 6/2001 | Esterson et al. | |
| 6,312,030 B1 | | 11/2001 | Johannes et al. | |
| 6,536,118 B1 | * | 3/2003 | Campbell | 30/322 |
| 6,598,297 B1 | * | 7/2003 | Matt | 30/142 |
| 2002/0073853 A1 | | 6/2002 | Norcross | |

FOREIGN PATENT DOCUMENTS

| | | |
|---|---|---|
| GB | 279 262 A | 10/1927 |
| GB | 279262 | 10/1927 |

OTHER PUBLICATIONS

Pearson Dental Supply catalog page—Claw Elevator.

7 photos at all angles of Pigtail® food handling device.

European Search Report dated Nov. 7, 2003 for European Application No. 03090217.5-1260, filed on Jul. 15, 2003.

* cited by examiner

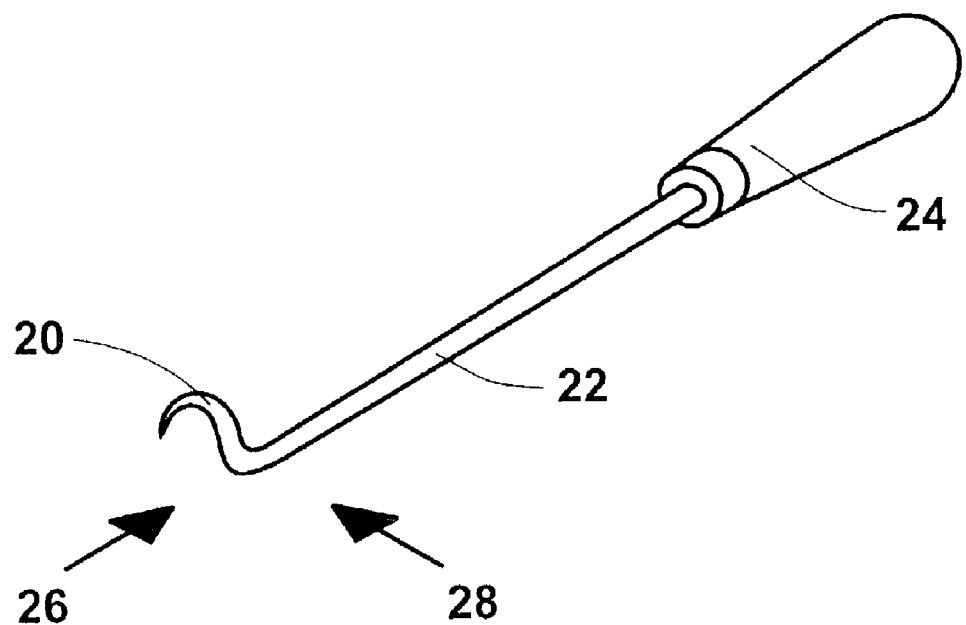
Figure 1 - prior art
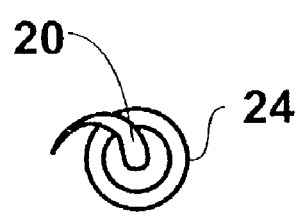
Figure 2 - prior art
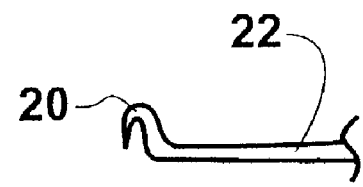
Figure 3 - prior art

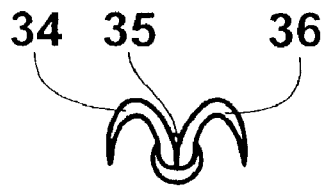
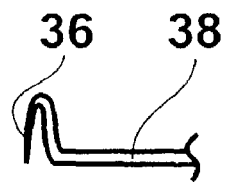
Figure 4 prior art
Figure 5 prior art
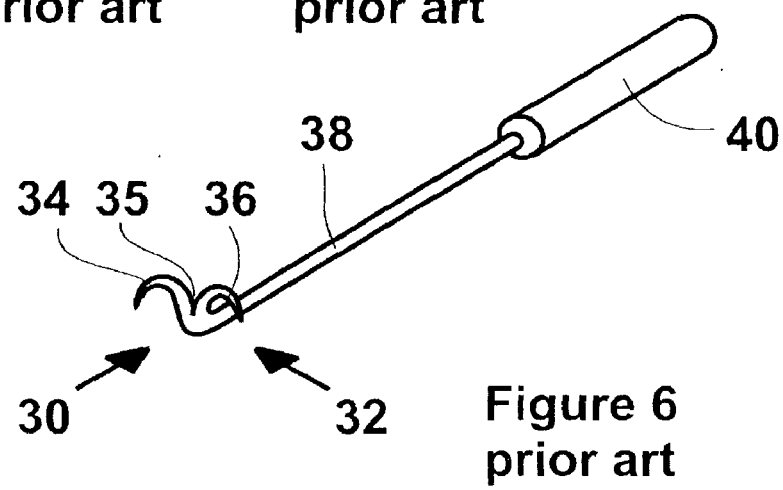
Figure 6 prior art
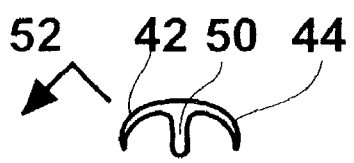
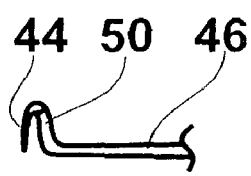
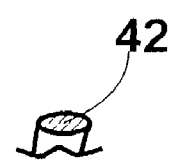
Figure 7
Figure 8
Figure 9
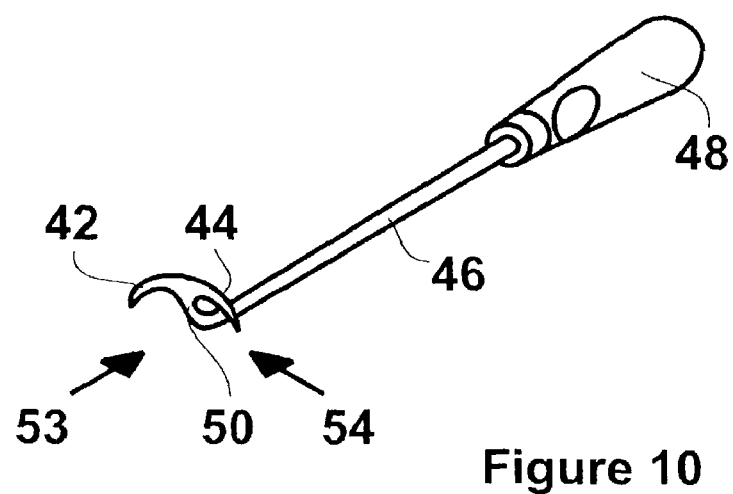
Figure 10

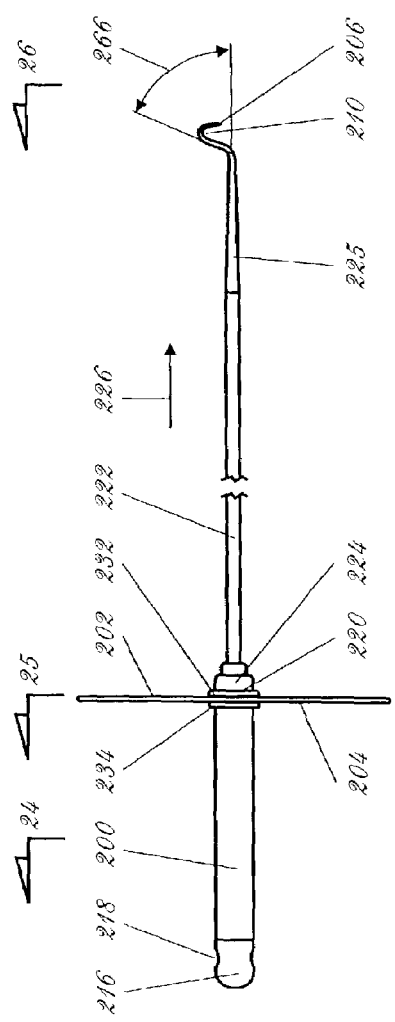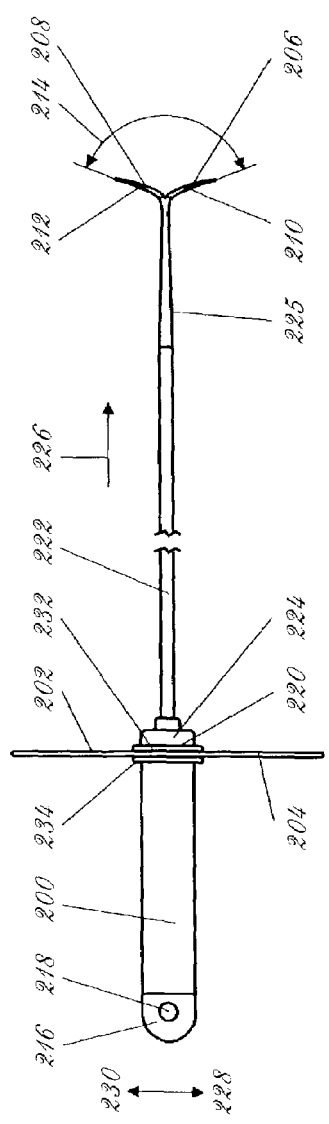
Fig. 22
Fig. 23

US 7,065,883 B2

DEVICE TO LIFT, MOVE AND FLIP FOODS

FIELD OF THE INVENTION

The present invention is directed to a device to lift, move and flip over foods.

BACKGROUND OF THE INVENTION

Many devices are available today to lift, move and flip over foods. Among the most common are spatulas. Cooking tongs are also commonly found in kitchens and are used for lifting and flipping foods, particularly thicker foods such as steaks and hamburgers.

A device which offers significant improvements over both these earlier categories of food lifting and flipping devices is illustrated in U.S. Pat. Nos.: 5,896,668, 5,813,120, 3,162,475, 4,734,984, 2,604,350, 1,202,120. The device is simply a transverse pointed hook on one end of a shaft. The opposite end of the shaft has a handle. By rotating this hook about the shaft axis, the user can pierce the food, and thereafter lift, move and/or flip the food over in a similar manner to that shown in FIGS. 15 and 16 attached hereto. FIGS. 1 to 3 attached hereto show an example of this device.

All kinds of foods may be lifted and flipped using this device including: meats, vegetables, fowl, hamburgers, fruits, breads, baked goods and much more. The device, however, has several shortcomings. First, the hook curves in only one direction. This favors right handed users to the disadvantage of left handed users or vise versa. This also means that it is easier to lift foods that are close to one side of a fry pan or other walled cooking vessel, verses foods that are close to the pan's or vessel's opposite side wall. The same is true when lifting foods from jars or other confined locations.

U.S. Design Pat. Des. 268,561 shows an artistic design improvement over earlier art with two hooks at the end of a shaft, each hook the mirror image of the other, and each hook being transverse to the shaft. FIGS. 4 to 6 attached hereto illustrate this device.

It would be helpful to have a device incorporating the ease of use and versatility of this hooked device with the versatility of a device which could be used easily by both right and left handed users as well as a device which could maneuver to pick up foods in all corners of pots and pans. Also, it might be helpful to have a device which would resist tearing of foods. Ease of construction to lower production costs would also benefit this category of device. As an example, it might reduce manufacturing costs if the device could be stamped from sheet stainless steel instead of requiring expensive welding and forming. Also, because these devices may be used near splattering hot grease and oil, as well as near burners and flame, means of protecting users from burns and getting dirty would be advantageous.

BRIEF DESCRIPTION OF THE DRAWINGS

FIG. 1 a perspective view of a prior art device;
FIG. 2 is an end view of the device of FIG. 1;
FIG. 3 is a partial side view of the device of FIG. 1;
FIG. 4 is an end view of a prior art device of FIG. 6;
FIG. 5 is a partial side view of the prior art device of FIG. 6;
FIG. 6 is a perspective view of a second prior art device;
FIG. 7 is an end view of a first embodiment food grabbing device of the present invention;
FIG. 8 is a partial side view of the device of FIG. 7;
FIG. 9 is a cross-sectional view taken along line 52 of FIG. 7;
FIG. 10 is a perspective view of the first embodiment cooking device of the present invention;
FIG. 22 is a side view of a seventh embodiment food grabbing device of the present invention;
FIG. 23 is a top view of the food grabbing device of FIG. 22.

DETAILED DESCRIPTION OF THE INVENTION

Figure 11:
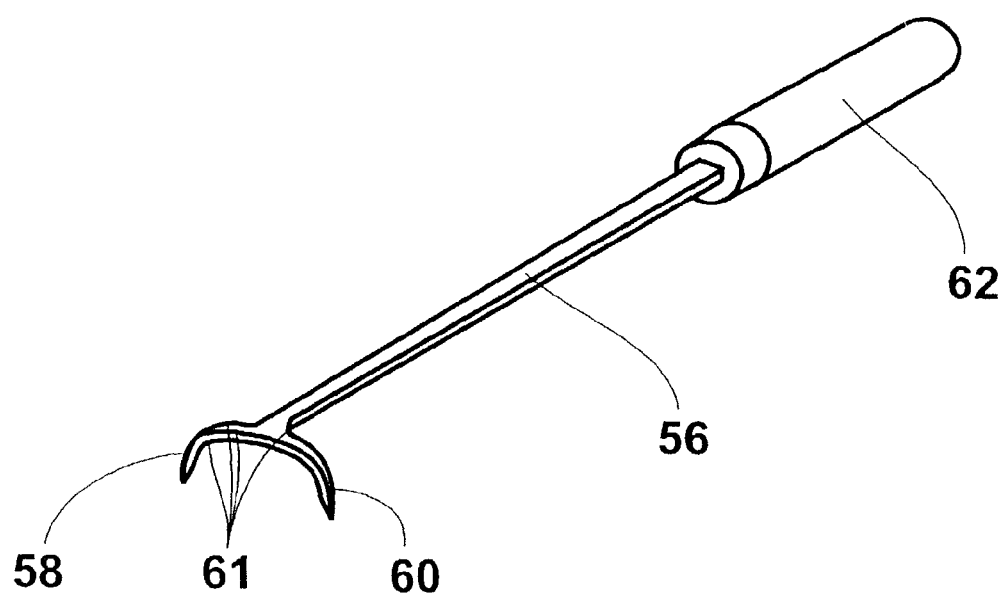
FIG. 11 is a perspective view of a second embodiment food grabbing device of the present invention.

FIGS. 1–3 illustrate a typical prior art device showing transverse pointed hook 20 on the end of shaft 22 which has handle 24 affixed to its other end. Arrows 26 and 28 indicate the orthogonal directions of view for FIGS. 2 and 3 respectively.

FIG. 4 also illustrates a prior art device found in U.S. Design Pat. Des. 268,561. Transverse pointed hooks 34 and 36 are shown. FIG. 5 illustrates transverse pointed hook 36 and one end of shaft 38. FIG. 6 illustrates handle 40 with elements 34, 36, 38 and viewpoints 30 and 32 described earlier.

FIG. 7 illustrates a first embodiment food grabbing hook device of the present invention with left transverse pointed hook 42 and right transverse pointed hook 44 shown. Bend 50 at end of shaft 46 is also shown along with section arrow 52 indicating the view shown in FIG. 9. FIG. 8 is a broken-out side view of the embodiment shown in FIG. 7 showing right transverse pointed hook 44 and bend 50 at the end of shaft 46 as well as one end of shaft 46.

FIG. 9 is a section view as indicated by section arrow 52 in FIG. 7. The elliptical cross section with a wide aspect ratio of over one-and-one-half times the width relative to one times the depth, is different from the circular cross section suggested in prior art, and reduces the tendency of food to tear when hooked. In general, a wide aspect ratio, particularly one greater than one-and-one-half to one, regardless of cross section (e.g. rectangular, curved square, trapezoidal, etc.) reduces the likelihood of tearing hooked foods.

FIG. 10 is a perspective view of the embodiment illustrated in FIGS. 7, 8 and 9. This view shows handle 48 as well as elements 42, 44, 46 and 50 described earlier. By bending shaft 46 at its end, and attaching transverse pointed hooks 42 and 44 at the end of the bend, a simple flick of handle 48 is magnified by the extension of the bend, thus reducing the workload needed to hook foods. Also, when compared to the prior art illustrated in FIGS. 4, 5 and 6, cleaning is simplified by not having tapered crotch 35 where foods may collect.

FIG. 11 shows a perspective view of a second embodiment device of the present invention which may have shaft 56 and integral transverse pointed hooks 58 and 60 stamped from sheet material such as stainless steel before being inserted into handle 62. Such manufacturing is easier than the forming suggested by the prior art. Hooks 58 and 60, unlike the first embodiment hooks 42 and 44, have their bases emanate in line with each other and on plane with shaft 56, which may also help make them easier to manufacture, and may require less hand turning about the axis of shaft 56 to hook into foods to be lifted or moved. This simpler geometry may also make cleaning easier as well. Angular edges, such as 61, may also aid in the embodiment being used to scrape grills or clean other surfaces.

Figure 12:
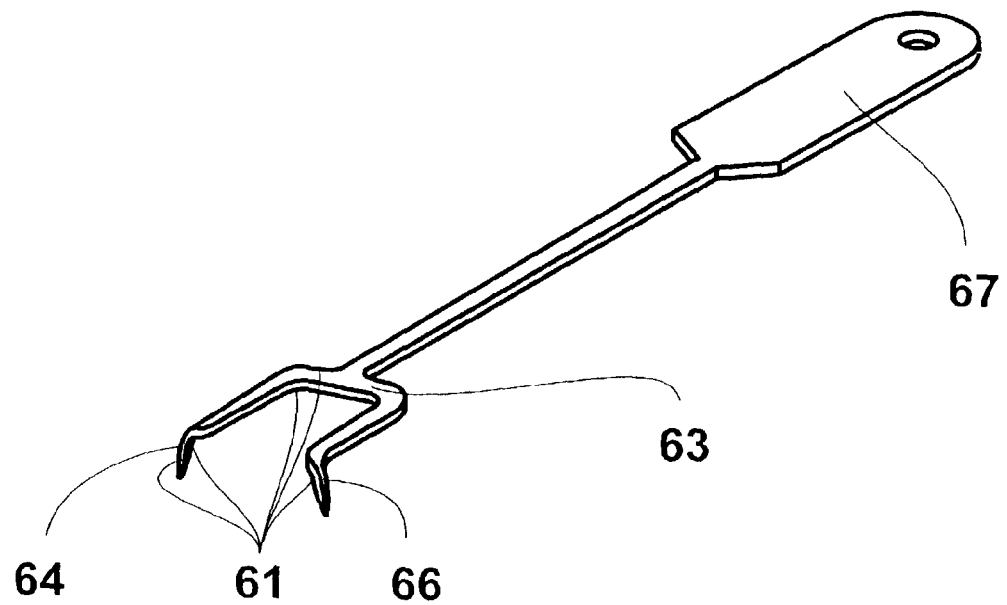
FIG. 12 is a perspective view of a third embodiment food grabbing device of the present invention.

FIG. 12 shows a perspective view of a third embodiment which has a bent-fork-like arrangement 63 for linking transverse pointed hooks 64 and 66. This bent-fork-like arrangement may make viewing foods being hooked easier, and also may have advantages in simplifying cleansing, both because food doesn't have a tendency to touch the back of the fork, and because all surfaces are generally easy to reach and clean, with few nooks or crannies.

FIG. 12 further shows a handle 67 which may be stamped concurrently with the rest of the embodiment out of a single sheet of material, such as stainless steel, thus further simplifying construction and further reducing manufacturing costs. Because it lacks crevices where pieces meet, this embodiment is easier to clean than embodiments assembled from two or more separate pieces. Likewise, fewer pieces generally mean a stronger, more robust construction which has less chance of breakage during use. And the flat wide handle illustrated in FIG. 12 may offer good leverage in gripping, lifting, rotating and flipping foods.

Figure 13:
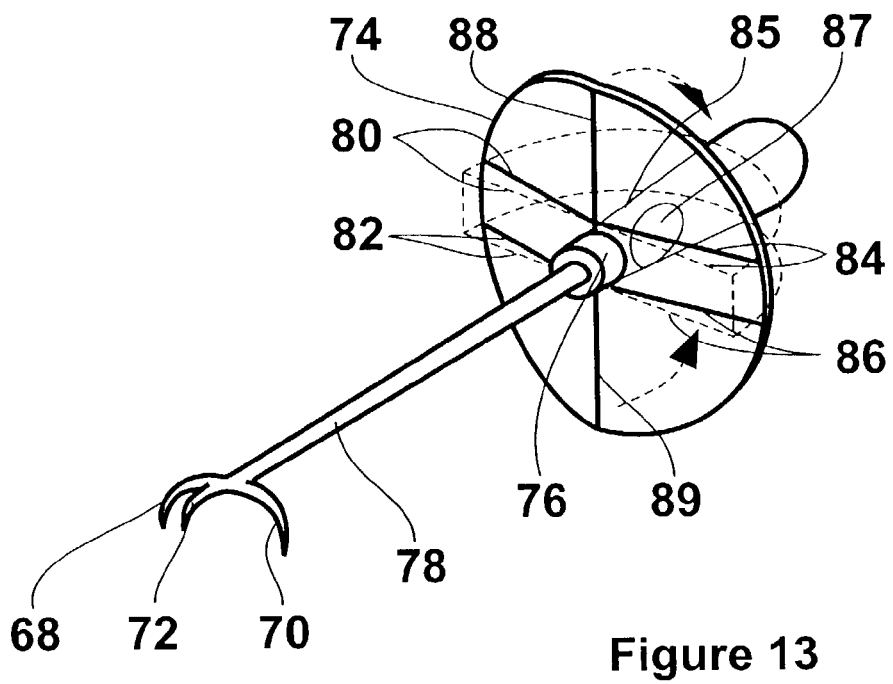
FIG. 13 is a perspective view of a fourth embodiment food grabbing device of the present invention.

FIG. 13 shows a fourth embodiment with transverse pointed hooks 68 and 70 and shaft extension pointed hook 72. Hook 72 allows foods to be stabbed and lifted in a similar manner to using a conventional fork, but with improved results due to the curvature and compactness of hook 72. As a first example, foods may have less of a tendency to fall off the end of hook 72 once grabbed due to the curvature in the hook. Like earlier hooks described in FIGS. 7 to 10, shaft extension hook 72 may be flattened in cross section, as shown in FIG. 9, with an elliptical, rectangular or other cross section, and with a flattened aspect ratio, which is particularly advantageous if its width exceeded its depth by a factor of at least one-and-one-half times. As a second example, hook 72 may be able to fit into, and grab objects in, a jar which a fork may be too large for. Again a wide aspect ratio in cross section of hook 72, particularly one wider than 1.5 to 1 at right angles to the plane of the curve of hook 72, may help reduce the tendency of foods being hooked to tear because for any given size of hole a point might make in snagging the food or other object, a larger percentage of the perimeter of the hole will be closer to right angles to the direction of lift or movement than if the hole were circular (i.e.: have an even or 1 to 1 aspect ratio).

FIG. 13 shows depressions 85 and 87 in handle 76 which help the user to orient the embodiment through tactile sensation for proper use. Likewise a single or multiple depressions or projections on or proximate to the handle might provide similar advantages for helping the user to orient the embodiment for proper use through tactile sensation.

FIG. 13 also shows shield 74 mounted to the lower end of handle 76. Shield 74 helps prevent user burns, discomfort and/or cleaning problems from using the fourth embodiment near or around: splattering grease, hot water, steam, burners, flames, or other sources of heat or soilage. Shield 74 may be permanently mounted or may be removable. As an example it may be removable by sliding it over handle 76 or down shaft 78 and over hooks 68 and 70. Shield 74, if removable, might snap into an annular groove in the handle, in the same manner as a garment snap, such as used on blue jeans. Slots emanating from the center hole of shield 74 may be needed to help this sliding and removal. As a second example, it may be secured in a friction fit onto a cylindrical section of the handle. This may be done by hand, without use of tools.

Shield 74 is illustrated with hinges 80, 82, 84 and 86, and bends 88 and 89 in its face. Shown in solid lines, the open position of shield 74 utilizes molded-in bends 88 and 89 to stiffen and open shield 74 when shielding is desired. When a more compact geometry is desired, such as when the fourth embodiment is being stored, the top and bottom of shield 74 may be folded back as shown in the dotted lines in FIG. 13, using hinges 80, 82, 84 and 86. Alternatively, shield 74 may be turned around 180 degrees and its top and bottom folded forward to achieve its more compact geometry. Folding shield 74 forward may make it easier to use the fourth embodiment when shield 74 is not open.

Shield 74 may be opaque, or as an alternate, may be, as illustrated in FIG. 13, translucent, even to the point of transparency, to help in seeing objects being hooked. As an example, shield 74 may be molded from translucent polypropylene which may: resist grease damage, resist heat, allow for molded in bends such as bends 88 and 89, and permit "living" hinges such as 80, 82, 84 and 86. Shield 74 may likely be adapted to fit most prior art or any of the preferred embodiments illustrated herein.

Figure 14:
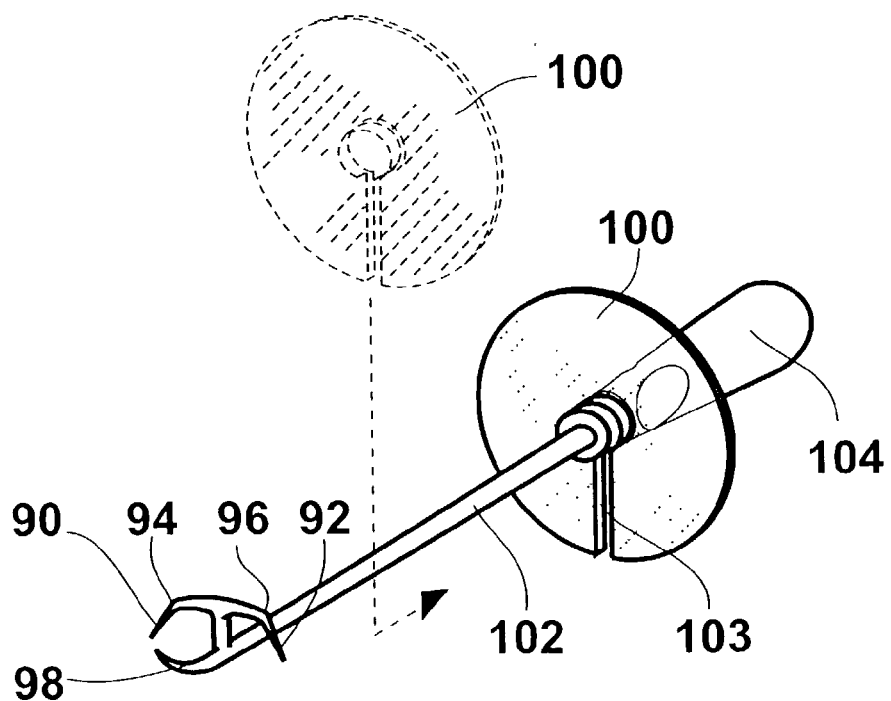
FIG. 14 is a perspective view of a fifth embodiment food grabbing device of the present invention.

FIG. 14 shows a fifth embodiment with transverse pointed hooks 90 and 92. These hooks instead of being arcuate as in the other preferred embodiments shown earlier are essentially pointed straight rods with respective bends 94 and 96 to angle their points. This bending may be easier to manufacture, and may hook and lift as well or better, than arcuate designs.

Shaft extension pointed hook 98 is also illustrated in FIG. 14, but unlike shaft extension pointed hook 72 illustrated in the fourth embodiment, hook 98 curves upward. This may make hook 98 easier to use without a need to invert the fifth embodiment to use hook 98. Hook 98, as all hooks described herein, may be elliptical, rectangular, trapezoidal or other shape in cross section, and may benefit from a cross section width of at least one-and-one-half times its cross section depth for reasons explained earlier.

FIG. 14 also illustrates shield 100 which may serve the same functions as shield 74. Shield 100 slides over shaft 102 and onto the forward end of handle 104. Shield 100 does not need to flex. This means shield 100 can be made in one piece from rigid materials, as examples from acrylic, polypropylene, SAN, or polycarbonate. Shield 100 may be slid off for storage or when not needed as shown by the dotted lines in FIG. 14. Again, shield 100 can snap into an annular groove in handle 104 or shaft 102 for mounting, or may be held by a fit coupled by friction. Slot 103 allows the user to insert shield 100 onto shaft 102 without going over hooks 90 and 92. Slot 103 may also provide the springiness to the hole in the center of shield 100 to help it snap into an annular groove on, or mount by friction to, handle 104 or shaft 102. Dimples, holes or other irregularities may be substituted to snap onto and hold either shield 74 or 100.

All of the embodiments illustrated herein may also likely be used for other purposes. As examples, they may be used to push foods around in a fry pan, or stir foods in water or boiling water, or move foods in a wok, or flatten bacon in a fry pan, or pierce plastic packaging to ease opening, or scrape soilage off grills, or pierce foods to help spices and/or marinades penetrate the foods, or lift non-food objects such as cloth or paper or other things, or grab objects such as a fisherman grabbing a fish hooked on his line or a rope on a dock, or to help lift debris, or help grab trash from the ground or elsewhere, etc.

Also, features of each embodiment may be adapted to fit other embodiments. As examples, hooks 42, 44, 68, 70, 72, 90 and 92 shown in the figures may be done by stamping the design from sheet material as suggested in the second and third embodiments. This might result in the hooks being generally rectangular in cross-section. Likewise, shield 74 and shield 100 might each be interchanged with the other, or might be each individually adapted to fit onto any of the other embodiments. Or bent hooks 90 and 92 might replace any of the arcuate hooks; or any of the handles shown on the embodiments might be interchanged, etc.

Figure 16:
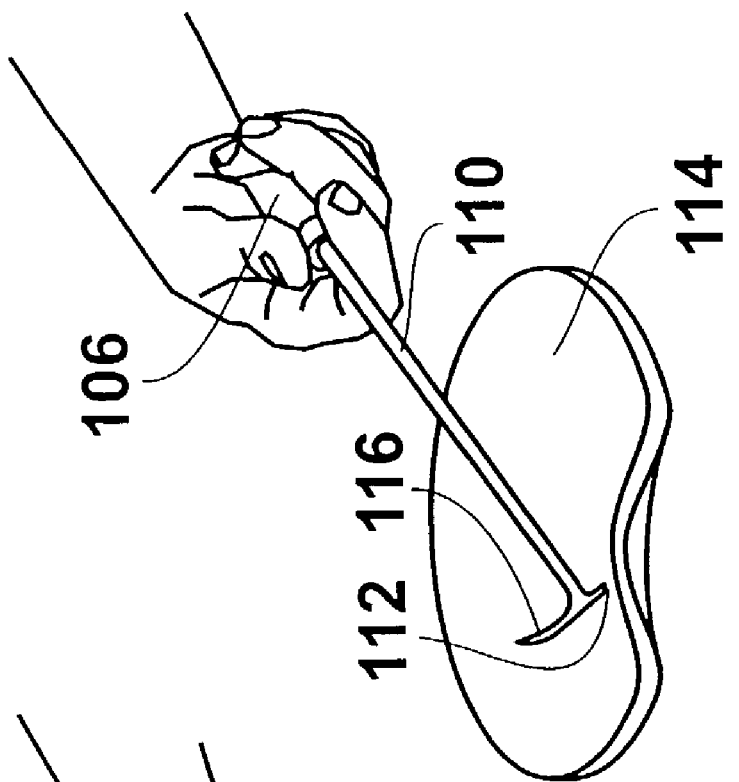
FIG. 16 is a further perspective view of the food grabbing device of the present invention in use.
Figure 15:
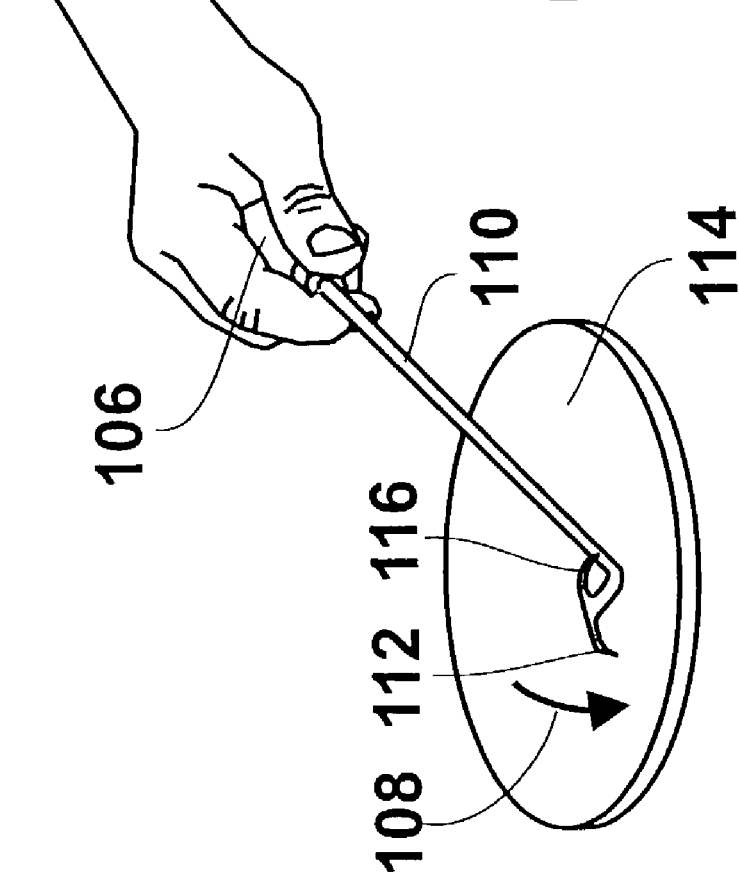
FIG. 15 is a perspective view of the food grabbing device of the present invention in use.

FIGS. 15 and 16 show how a typical embodiment might be used. A user grabs typical handle 106 and rotates 108 the handle about the axis of typical shaft 110 so that typical transverse pointed hook 112 penetrates into typical item 114 to be grabbed. FIG. 16 shows typical item 114 after it has been grabbed and is started to be lifted. Mirror imaging FIGS. 15 and 16 will show how a left handed person might gain advantage over prior art using the same embodiments. That is, the embodiments illustrated are equally easy to use for both right and left handed individuals. Likewise, the typical embodiment may be rotated in a direction opposite 108, hooking typical transverse pointed hook 116 into item 114. This versatility may make the embodiment flexible in use, particularly in restricted or confined areas such as cooking vessel like fry pans, particularly small fry pans, as examples, and jars, like pickle and olive jars as examples.

Figure 17:
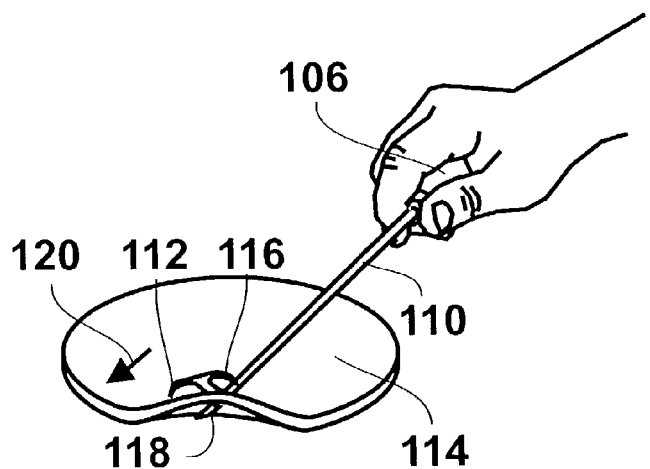
FIG. 17 is a perspective view of the food grabbing device of FIG. 14 in use.

FIG. 17 shows how an embodiment, such as shown in FIG. 14 as an example, having a third hook extending from the end of shaft, might pickup food using the third hook. Typical third hook 118 is simply thrust forward 120, causing it to penetrate article to be lifted 114 where thereafter article 114 may be lifted.

Figure 18:
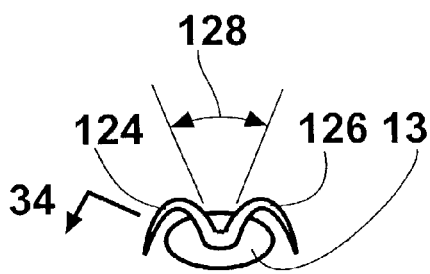
FIG. 18 is an end view of a sixth embodiment food grabbing device of the present invention.

FIG. 18 shows a sixth embodiment with transverse pointed hooks 124 and 126 separated at their base by angle 128 which is at least 30 degrees and may be as much as 180 degrees. The viewpoint of FIG. 18 is indicated by arrow 134 in FIG. 21. Angle 128 in FIG. 18, when compared to the prior art illustrated in FIGS. 4 to 6 which have transverse pointed hooks 34 and 36 which are conjoined at their base, may require less handle rotation in either direction to snag foods and other articles. As an example, if angle 128 is 30 degrees, and the hooks on both the prior art and the sixth embodiment share the same geometry, then the sixth embodiment should require 30 degrees less rotation than the prior art between picking up food using clockwise shaft 130 rotation and picking it up using counterclockwise shaft 130 rotation. This may make the sixth embodiment significantly easier to use than the cited prior art.

The sixth embodiment shows elliptical handle 136 which may provide, when compared to a cylindrical handle, tactile orientation for the embodiment as well as a comfortable grip with good leverage for lifting and flipping articles.

Figure 19:
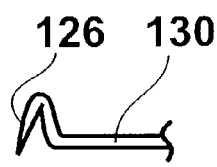
FIG. 19 is a partial side view of the food grabbing device of FIG. 18.
Figure 20:
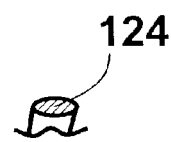
FIG. 20 is a cross-sectional view taken along line 34 of FIG. 18.
Figure 21:
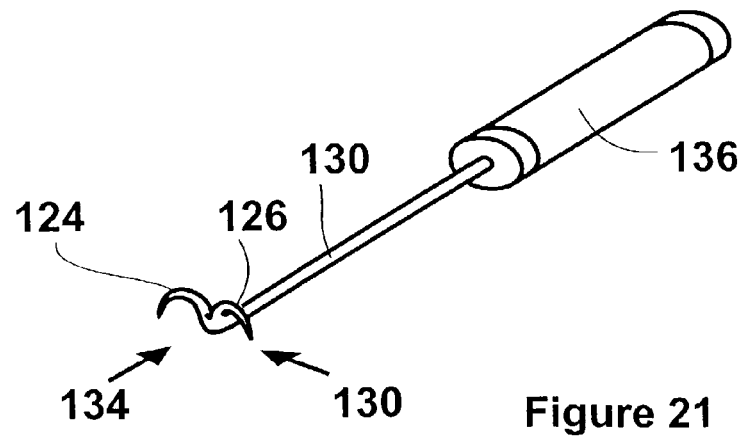
FIG. 21 is a perspective view of the sixth embodiment food grabbing device.

FIG. 19 is a side view of the sixth embodiment as indicated by arrow 130 in FIG. 21. FIG. 20 is a section view of the sixth embodiment as indicated by section arrow 132 in FIG. 18. Again, the cross section shows a flattened aspect ratio of at least 1.5 to 1.

Figure 25A:
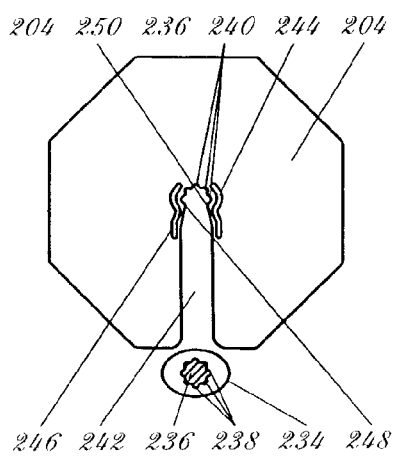
FIG. 25A is a cross-sectional view taken along line 25 of FIG. 22 wherein a shield is not engaged with the device.
Figure 25B:
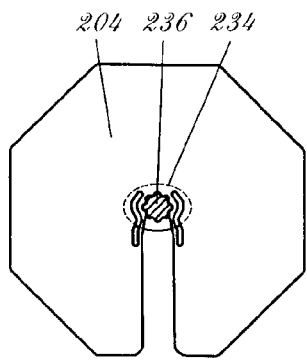
FIG. 25B is a cross-sectional view taken along line 25 of FIG. 22 wherein the shield is engaged with the device.
Figure 25C:
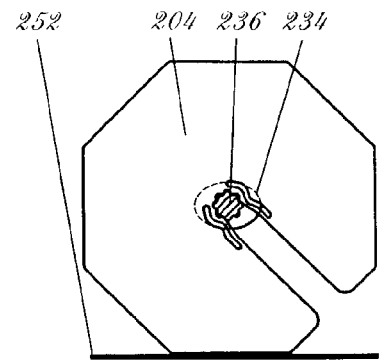
FIG. 25C is a cross-sectional view taken along line 25 of FIG. 22 wherein the device is rotated.
Figure 26:
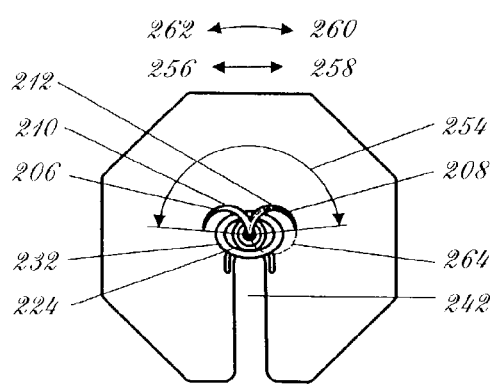
FIG. 26 is an end view of the device of FIG. 22.
Figure 27:
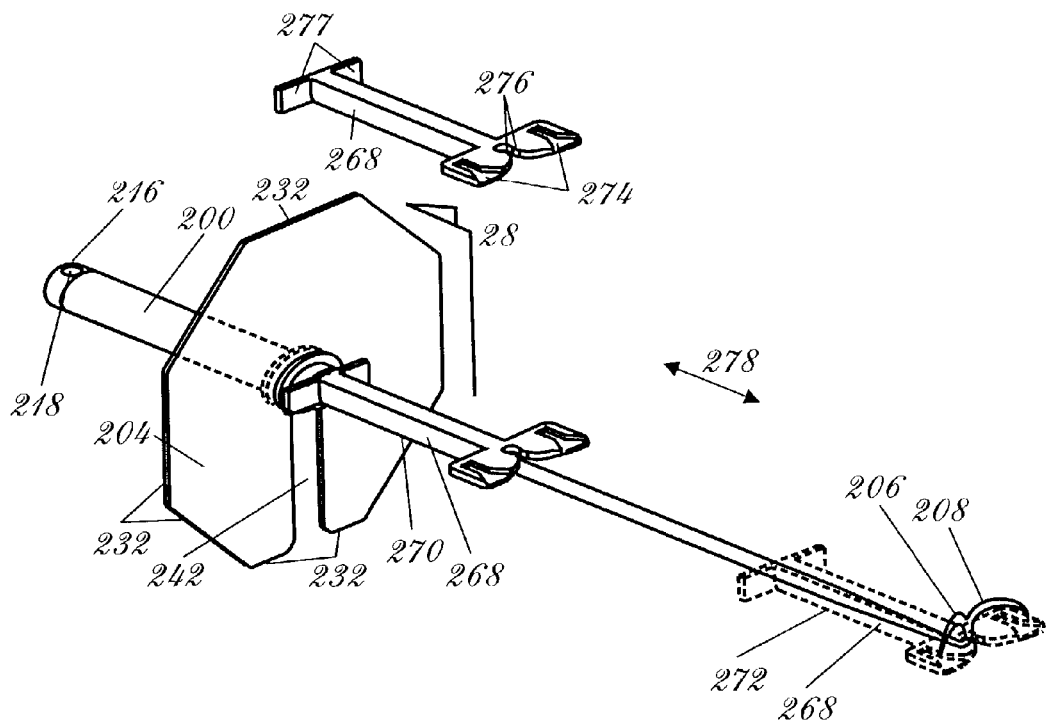
FIG. 27 is a perspective view of the device of FIG. 22 including a guard.

Referring to FIGS. 22 to 27, and moving from left to right in FIGS. 22, 23 and 27, a seventh embodiment is illustrated which comprises: handle cap 216 which mounts on the rear end of handle 200. Handle cap 216 includes hole 218 used for hanging or for other purposes.

On the opposite end of handle 200 from cap 216 is shield mount 220 which removeably mounts polygonal shield 204. Extending from the forward 226 end of shield mount 220 is shaft support 224 which securely holds shaft 222 and rigidly attaches it to handle 200. On the opposite end of shaft 222 from shaft support 224 is tapered portion 225 of shaft 222. Generally, shaft 222 is consistently cylindrical except for tapered portion 225.

Tapered portion 225 on the forward 226 end of shaft 222 firmly attaches hooks 206 and 208 to shaft 222.

Referring to FIG. 23, when viewed from above, the seventh embodiment is generally symmetrical side 228 to side 230. Shield 204 may be removed from shield mount 220 and may be securely remounted in any of several rotary positions at the user's discretion.

When resting on a countertop or other surface, flats 232 (seen on FIGS. 25A to 27) on the periphery of shield 204 help prevent the embodiment from rolling or moving uncontrollably when placed on a surface. Further, shield 204 may be constructed of material which allows shield 204 to be looked through. This would mean shield 204 could provide protection without significantly hindering the user's vision. Also shield 204 can be removed from the rest of the embodiment for storage so it will stow more compactly, or so the embodiment may be used without the shield where protection is not necessary or perhaps not desired, or removed for other purposes.

In use, the embodiment may be stored in a drawer or cabinet or other suitable location, or it may be hung perhaps using hole 218 in handle cap 216 either directly such as on a post or nail or the like; or using a string or other filament secured through hole 213. Shield 204 may be removed for compactness or other purposes during storage, or it may be left on.

Referring to FIGS. 22, 23, 25, 26 and 27, when mounted, shield 204 is secured between forward flange 232 and rear flange 234 of shield mount 220. Core 236 extends between and connects rear flange 234 with forward flange 232. Core 236 is gear shaped in cross section with an essentially circular sinusoidal periphery. Specifically, core 236 has eight curved gear teeth 238 regularly protruding from its periphery.

As shown in FIGS. 25B and 25C, gear teeth 238 engage detents 240 near the center of shield 204 when shield 204 is mounted to shield mount 220. This results in shield 204 being secured in one of eight radial positions each 45 degrees separated from the next.

Each of these eight positions corresponds to one of the eight flats 232 on the periphery of shield 204 resulting in flats 232 of shield 204 always having a specific predictable radial relationship between flats 232 and hooks 206 and 208 no matter how the user mounts shield 204. This predictability may make it easier to use the refined embodiment. As shown in FIG. 26 each of these eight positions allows the embodiment to rest with the tips of hooks 206 and 208 approximately equidistance from a countertop such as 252 in FIG. 25C.

Mounting shield 204 is accomplished by the user sliding shield 204 between rear flange 234 and forward flange 232 as shown in FIGS. 25A and 25B. Shield 204 is a regular octagon with slot 242 interrupting one of its eight flat sides 232. Slot 242 allows shield 204 to slide onto shield mount 220 by straddling core 236. As shown in FIGS. 25A and 25B, resilient snap slots 244 and 246 help allow protrusions 248 and 250 to snap over and engage core 236.

Shield 204 may protect user from heat, hot oil, hot water, hazardous chemicals, or other materials and/or conditions. The embodiment may be used with or without shield 204 mounted. Shield 204 may be constructed in any of many different materials and using any of many different manufacturing processes. As examples; shield 204 may be constructed of clear, natural or pigmented: polypropylene, polyethylene, ABS, acrylic, nylon, SAN, PBT other plastic; or stainless steel, steel, aluminum, or other metal, or ceramic, or other material. It may be manufactured by: injection molding, stamping, laser cutting or other manufacturing process.

For example, injection molding shield 204 from clear polypropylene may have several advantages which may include one or more of the following: low cost (due to inexpensive production methods, low material costs and fast molding cycle times), high production rates, relatively inexpensive tooling, resistance to grease, oil, other chemicals and detergents, high and low temperature resistance, long material life, dishwasher safe, translucence, simple and low cost to mold in other features such as graphics, text, clips brackets etc.

Hooks 206 and 208 are essentially circular arcs as demonstrated by dotted line circle 264 in FIG. 26. Each hook, 206 and 208, is formed along a plane which when viewed from the side, as in FIG. 22, tilts forward from the end of shaft 222 in angle 266. Likewise these planes along which hooks 206 and 208 are formed, when viewed from the top, as in FIG. 23, tilt in generally symmetrical angle 214 forward from the end of shaft 222.

Angle 266 is measured in side view FIG. 22 from the axis of shaft 222 to the joint line between the planes containing hooks 206 and 208. Angle 214 is measured in top view FIG. 23 from a horizontal plane extending from the axis of shaft 222, to the lines where this horizontal plane meets the planes containing hooks 206 and 208. Efficiency in coupling, uncoupling and moving food and other articles using the embodiment has been found when angle 266 is between 54 and 76 degrees, and, angle 214 is between 123 and 147 degrees.

When angle 266 is less than 54 degrees food or other artless tend to unscrew off the hook particularly when used in jars and deep pans. When angle 266 is greater than 76 degrees the point where hooks 206 and 208 meet shaft 222 tends to protrude and interfere with foods and other articles being hooked. Similarly, when angle 214 is less than 123 degrees, it tends to let food and other articles slip off of hooks 206 and 208 particularly when shaft 222 is in a more vertical position. And when angle 214 is greater than 147 degrees it becomes more difficult to hook foods and other articles because the joint between hooks 206 and 208 and shaft 222, bumps against the foods or articles before they are fully engaged with hooks 206 or 208.

FIG. 26 shows a front view of the embodiment with general symmetry between left 256 and right 258. Food or other articles are picked up or moved by the embodiment as described above with hook 206 or hook 208 piercing the article, and handle 200 being rotated clockwise 260 or counterclockwise 262 to engage the article. The article is then lifted or moved as desired after which the embodiment is disengaged from the article by rotating handle 200 counter clockwise 262 or clockwise 260 to separate hook 206 or hook 208 from the article.

Angle 254 in top view FIG. 26, extends from the axis of shaft 222 to the tips of hooks 206 and 208. To engage foods and other articles most efficiently, angle 254 should be between 149 degrees and 166 degrees. Greater than 166 degrees causes an undesired tendency for the hook not engaging the article to engage the article when the refined embodiment is rotated to disengage the article. If angle 254 is less than 149 degrees, it may be difficult or uncomfortable without repositioning the user's hand grip on handle 200, to engage articles by rotating the refined embodiment counterclockwise 260 and alternately counterclockwise 262.

The dimension from tip of hook 206 to the tip of hook 208 has been found to be particularly important in achieving generally comfortable and easy use of the embodiment. On embodiments that will be used in a home kitchen, a distance between 1⅜ and 1¾ inches between the tip of hook 206 and the tip of hook 208 has been found to be particularly convenient for use with fry pans of 7 to 14 inches in diameter, and in common jars, and with Tupperware® type containers, and with 6 to 10 inch diameter pots, as well as with other common kitchen items. Smaller hooks tend to provide insufficient grip on common articles, and larger hooks tend to be too clumsy within or around the above items.

In commercial kitchens and for outdoor barbeques, a distance between 2¼ inches and 2¾ inches from the tip of hook 206 to the tip of hook 208 has been found best for general use. This is because pots and pans and storage containers and other items used in these environments tend to be larger than those used in home kitchens, and also because food items handled may also be larger. Space in general in these environments tends to be less cramped than in home kitchens.

Engaging food and other articles by rotating the refined embodiment clockwise 260 or counterclockwise 262 using the same hand without repositioning the hand, may be one of the advantages of using the embodiment. Likewise, using the embodiment in either a user's left or right hand can be yet another advantage. Also, being able to use the embodiment in confined situations such as near or against the left or right side of a pan or near or against the left or right side of a jar is yet another advantage.

Figure 24:
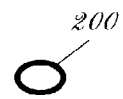
FIG. 24 is a cross-sectional view taken along line 24 of FIG. 22.

As shown in FIGS. 22 to 24, handle 200 is essentially an elliptical rod on its exterior. This shape allows easy and effective grip with adequate leverage for lifting and flipping while still allowing easy repositioning of the user's hand to accommodate various use conditions including near vertical use of the embodiment in jars and cups, and near horizontal use on grills and shallow pans and a full range of use conditions between the vertical and horizontal.

Although the handle may be constructed at any size, a length of 3½ inches to 4¾ inches has been found to be particularly advantageous for both users with relatively small and large hands. Likewise, a handle elliptical cross section having a minor axis dimension between ½ inch and ¾ inch and having a major axis dimension between ⅝ inch and one inch has also been found to be particularly useful in providing users with both relatively small and large hands with an effective and comfortable grip.

Three particular lengths have been found particularly useful in fabricating the embodiment. For an embodiment used in home kitchens with pots, pans, jars, stove top grills, fry pans, countertop grills, plastic storage ware, sinks, storage bins, etc., a length of between 9 and 11 inches measured from where shaft 222 exits shaft support 224 to the tip of hook 206 has been found exceptionally convenient. For an embodiment used in commercial kitchens with larger pots, pans, jars, grills, fry pans, plastic storage containers, sinks, storage bins, etc., a length of between 15 and 17 inches measured from where shaft 222 exits shaft support 224 to the tip of hook 206 has likewise been found exceptionally convenient. And finally, for an embodiment used with outdoor barbeques, a length of between 20 and 22 inches measured from where shaft 222 exits shaft support 224 to the tip of hook 206 has similarly been found exceptionally convenient.

The ends of hooks 206 and 208 are sharp to facilitate penetrating meats, vegetables and other materials. To prevent possible accidental injuries, a protective cover to shield the ends of hooks 206 and 208 may be used. Many designs may provide effective protection including pockets or envelopes to cover the hook ends or tubes which might cover the entire hook end of the refined embodiment.

Figure 28:
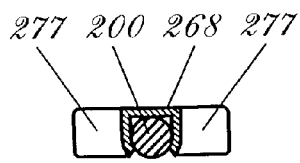
FIG. 28 is a cross-sectional view of the guard of FIG. 27 attached to the device.

One design which may provide both relatively easy use and good protection is shown in FIGS. 27 and 28. Guard 268 snaps on to and off of shaft 222. Guard 268, when snapped onto shaft 222, may also slide longitudinally 278 along shaft 222. When in retracted position 270, guard 268 does not interfere with the operation of the embodiment. When guard 268 is pushed forward to protective position 272 indicated in dotted lines in FIG. 27, protrusions 276 snap onto the conjoined base of hooks 206 and 208, holding guard 268 in protective position 272 where barriers 274 cover the tips of hooks 206 and 208 to prevent accidents.

Guard 268 may be left at all times on shaft 222 including during use and storage, or it may be removed for any reason. Using guard 268 when it is attached to shaft 222 simply entails sliding guard 268 between retracted position 270 when not in use, to protective position 272 to cover the tips of hooks 206 and 208.

Finger grip 277 helps provide a grip for retracting guard 268 from protective position 272 to retracted position 270. FIG. 28 illustrates how guard 268 may snap onto shaft 222. Guard 268 may be constructed of any of many different materials. These include plastics such as polypropylene, polyethylene, styrene, acrylic, SAN, PBT, nylon, ABS, etc.; metals including stainless steel, steel, aluminum, copper, etc., ceramics, and other materials. Many different manufacturing processes may be used to produce guard 268. These include injection molding, die stamping, die casting, etc. As an example, guard 268 may be injection molded from translucent or pigmented polypropylene. This provides: grease and chemical resistance, heat and cold resistance, low cost, high potential manufacturing rates, relatively inexpensive tooling as well as other advantages.

One skilled in the art would readily recognize that many variations from, and alternatives to, the above could be made and still utilize the present inventions. As just a few illustrative examples: shield 204 may have fewer or more than 8 flats on its periphery and they may be regular as in a pentagon, hexagon or square etc. or they may be irregular or even have curves or voids or concave or convex sections between flats on the shield periphery; the engagement between shield 204 may rely on something other than a snap fit with fixed radial resting points such as a friction fit between shield 204 and front flange 232 and rear flange 234 (a fit relying primarily on friction) or a friction fit between shield 204 and core 236, or a snap fit between shield 204 and front flange 232 and rear flange 234, or shield 204 might slide over core 236 with core 236 being hexagonal, octagonal or other shape rather than gear shaped; There may be more than hooks 206 and 208 at the end of shaft 222 such as was suggested in the antecedent to this application; dimensions other than those suggested herein may be advantageously used, particularly where a more focused and less general use is intended such as shaft 222 having a length of less than 9 inches and a distance of less than 1⅜ inches between the tips of hooks 206 and 208 in a device intended exclusively or primarily for removing items from jars; there may be a hook or hole 218 combined with a hook or detent or other device on the end of handle 200 to hang or store the embodiment; handle 200 might be round or square or triangular or other shape in cross section, or might be tear shaped, spherical, or other shape in general; shaft 222 might be elliptical, square, triangular, polygonal or irregular in cross section; the embodiment might be used for other purposes such as picking up trash or harvesting fruits from tree limbs or material handling in factories etc.; materials and fabrication methods other than those suggested might be used such as laying up shaft 222 out of carbon fiber composites or compression molding handle 200 from a thermo set resin; etc.

Embodiments incorporating the present inventions may be constructed at any scale and from a variety of materials. As examples, embodiments from six to twenty-four inches in length may be constructed with shorted lengths useful in home kitchens with typical home range tops. Longer lengths might be used for outdoor barbequing where there is more heat and more possibility of getting burnt or injured and where food items may be larger. Even larger versions still, such as twenty-four inches to thirty-six inches in length, might be used for picking up debris or use while fishing.

Materials used in construction may likewise vary widely. As examples, stainless steel or ceramics or composites or plastic or wood might be used to form some or all of the embodiments.

What is described and illustrated herein are preferred embodiments of the present inventions. Many variations of, alternatives to, and/or modifications of these embodiments, which incorporate some or all of the present inventions, will be obvious to those knowledgeable of the art. Thus the scope of patent protection afforded the present inventions shall thus solely be determined by the issued claims this specification is allowed as well as their legal equivalents, and not restricted by the limited descriptions of preferred embodiments contained herein.

What is claimed is:

1. A device for snagging food comprising:
   a handle;
   a shaft extending from the handle;
   an upward bend at the end of the shaft opposite the handle,
      wherein the end of the upward bend extends in a direction that is approximately at a right angle to the axis of the shaft; and a bent downward double pointed member linked crosswise generally at its center to the end of the upward bent end of the shaft, wherein the ends of the bent downward double pointed member extend in a direction that is generally opposite to the direction in which the end of the upward bend of the end of the shaft extends.

2. The device of claim 1 where there is a shield between the end of the handle furthest from the double pointed member and the double pointed member.

3. The device of claim 1 where the double pointed rod is bent downwards in an arc.

4. The device of claim 1 wherein at least a portion of a cross-section of the double pointed member has a dimension that is wider than it is thick.

5. The device of claim 4 where the cross-section of the double pointed member is at least twice as wide as it is thick.

6. The device of claim 4 where the cross-section of the double pointed member is generally elliptical.

7. A device to lift foods comprising:
  a handle;
  a shaft extending from the handle having an upwardly bent end, wherein the terminus of the upwardly bent end extends in a direction that is approximately at a right angle to the axis of the shaft;
  a first pointed hook and a second pointed hook crosswise linked to the upwardly bent end of the shaft opposite the handle, wherein the ends of the first and second pointed hooks extend in a direction that is generally opposite to the direction in which the terminus of the upwardly bent end of the shaft extends; and
  a shield mounted between an end of the handle and the first hook and the second hook.

8. The device of claim 7 where the shield is essentially flat and generally transverse to the shaft.

9. The device of claim 7 where the shield is essentially round.

10. The device of claim 7 where the shield is a nonperforated, translucent sheet.

11. The device of claim 7 where the shield can be manually removed from the shaft, handle, and hooks, without use of tools.

12. The device of claim 7 where the first hook is generally transverse to the shaft.

13. The device, of claim 7 where the second pointed hook is generally transverse to the shaft.

14. The device of claim 7 where the shield can fold.

15. A device to lift and move foods and other articles comprising:
  a rod having an upwardly bent end, wherein the terminus of the upwardly bent end extends in a direction that is approximately at a right angle to the axis of the rod, and wherein the rod has a double ended hook positioned on the upwardly bent end transverse to the rod axis, wherein the ends of the double ended hook extend in a direction that is generally opposite to the direction in which the terminus of the upwardly bent end of the rod extends, and the rod having at an opposite end a handle with a gripping section; and
  a shield located between the hook and the gripping section.

16. The device of claim 15 wherein there are a plurality of shield mounting positions.

17. The device of claim 15 wherein the shield is translucent.

18. The device of claim 15 wherein the shield is essentially planar.

19. The device of claim 15 wherein the shield is transverse to the axis of the rod.

20. The device of claim 15 wherein the shield is located between the terminus of the rod opposite the double ended hook and the gripping section of the handle.

21. The device of claim 15 wherein there is a slot extending from the periphery of the shield to its interior.

22. The device of claim 21 wherein there is a mount to attach the shield and the slot straddles the rod while attaching the shield to the mount.

23. The device of claim 15 wherein there is a mount and the shield attaches to the mount.

24. The device of claim 23 wherein the shield is removable from the mount.

25. The device of claim 23 wherein the shield engages the mount using a snap fit.

26. The device of claim 15 wherein there is a section on a periphery of the shield where two spaced apart points can touch a flat surface when the device is placed on a flat surface.

27. The device of claim 26 wherein the periphery of the shield is polygonal.

28. The device of claim 27 wherein the periphery of the shield is octagonal.

29. The device of claim 28 wherein the shield can be attached to the rod in eight positions.

* * * * *